(12) United States Patent
Park (10) Patent No.: US 12,436,064 B2
(45) Date of Patent: Oct. 7, 2025

(54) METHOD AND DEVICE FOR DETECTING MISFIRING CYLINDER OF RECIPROCATING INTERNAL-COMBUSTION ENGINE USING TORSIONAL VIBRATION SIGNAL

(71) Applicant: EONC CO., LTD., Changwon-si (KR)

(72) Inventor: Jeonggeun Park, Changwon-si (KR)

(73) Assignee: EONC CO., LTD., Changwon-si (KR)

( * ) Notice: Subject to any disclaimer, the term of this patent is extended or adjusted under 35 U.S.C. 154(b) by 0 days.

(21) Appl. No.: 18/269,764

(22) PCT Filed: Dec. 28, 2021

(86) PCT No.: PCT/KR2021/020096
§ 371 (c)(1),
(2) Date: Jun. 27, 2023

(87) PCT Pub. No.: WO2022/146001
PCT Pub. Date: Jul. 7, 2022

(65) Prior Publication Data
US 2024/0068909 A1 Feb. 29, 2024

(30) Foreign Application Priority Data
Dec. 28, 2020 (KR) .................. 10-2020-0184079

(51) Int. Cl.
*G01M 15/05* (2006.01)
*F02D 41/00* (2006.01)
*F02D 41/14* (2006.01)
*F02D 41/22* (2006.01)
*F02D 41/28* (2006.01)
*G01M 15/11* (2006.01)

(52) U.S. Cl.
CPC .......... *G01M 15/05* (2013.01); *F02D 41/009* (2013.01); *F02D 41/1498* (2013.01);
(Continued)

(58) Field of Classification Search
CPC ..... G01M 15/05; G01M 15/11; F02D 41/009; F02D 41/1498; F02D 41/22;
(Continued)

(56) References Cited

U.S. PATENT DOCUMENTS

| | | | | |
|---|---|---|---|---|
| 5,313,826 A | * | 5/1994 | Klauber | G01L 3/102 73/114.15 |
| 5,379,634 A | * | 1/1995 | Kuroda | G01M 15/11 73/114.04 |

(Continued)

FOREIGN PATENT DOCUMENTS

| | | |
|---|---|---|
| JP | 03-275962 A | 12/1991 |
| KR | 10-0749667 B1 | 8/2007 |

(Continued)

OTHER PUBLICATIONS

International Search Report for PCT/KR2021/020096 mailed Apr. 15, 2022 from Korean Intellectual Property Office.

*Primary Examiner* — Phutthiwat Wongwian
*Assistant Examiner* — Susan E Scharpf
(74) *Attorney, Agent, or Firm* — Revolution IP, PLLC (57) ABSTRACT

A method for detecting a misfiring cylinder is characterized by: performing frequency analysis on a torsional vibration signal from an internal-combustion engine system to extract an amplitude and a phase of a fundamental frequency component; comparing the amplitude of the fundamental frequency component with the amplitude of the torsional vibration signal to determine whether misfiring has occurred; calculating, when the misfiring is determined to occur, an explosion angle of a misfiring cylinder by using crank angle displacement at which the fundamental frequency component has a maximum value, and a phase of a fundamental frequency component with excitation force; and comparing the calculated explosion angle with an explo-
(Continued)

sion angle of explosion order to detect the position of the misfiring cylinder.

2 Claims, 10 Drawing Sheets

(52) U.S. Cl.
CPC ............. *F02D 41/22* (2013.01); *G01M 15/11* (2013.01); *F02D 2041/228* (2013.01); *F02D 2041/286* (2013.01); *F02D 2200/101* (2013.01); *F02D 2200/1012* (2013.01); *F02D 2200/1015* (2013.01); *Y02T 10/40* (2013.01)

(58) Field of Classification Search
CPC ......... F02D 2041/228; F02D 2041/286; F02D 2200/101; F02D 2200/1012; F02D 2200/1015; Y02T 10/40
See application file for complete search history.

(56) References Cited

U.S. PATENT DOCUMENTS

| 5,493,901 | A  | * | 2/1996 | Kuroda ................. G01M 15/11 123/436 |
| 9,605,617 | B2 | * | 3/2017 | Suzuki ................ F02D 41/1497 |
| 10,378,468 | B2 | * | 8/2019 | Minatoya ............ F02D 41/1498 |
| 2012/0232774 | A1 | * | 9/2012 | Minatoya ............... G01M 15/11 701/105 |
| 2016/0047327 | A1 | * | 2/2016 | Suzuki ................ F02D 41/1497 123/349 |
| 2018/0275017 | A1 | * | 9/2018 | Katayama ........... F02D 41/1498 |

FOREIGN PATENT DOCUMENTS

| KR | 10-1180410 B1 | 9/2012 |
| KR | 10-2015-0119404 A | 10/2015 |

* cited by examiner

Case 1 : 4-Stroke Inline Engine Generator Set

METHOD AND DEVICE FOR DETECTING MISFIRING CYLINDER OF RECIPROCATING INTERNAL-COMBUSTION ENGINE USING TORSIONAL VIBRATION SIGNAL

TECHNICAL FIELD

The present invention relates to a method for detecting a misfiring cylinder, which is one of the main causes of malfunction in a reciprocating internal-combustion engine system used throughout industries such as ships, automobiles, power generation facilities, and petrochemicals, and more particularly, to a method and device for detecting in real time whether a cylinder is misfiring and a position of a misfiring cylinder using the amplitude and phase of a fundamental frequency component obtained by frequency analysis of a torsional vibration signal of a reciprocating internal-combustion engine system.

BACKGROUND ART

In a reciprocating internal-combustion engine system, which is widely used as an industrial energy source such as propulsion and power generation, a misfiring phenomenon in which combustion does not occur in a specific cylinder during operation often occurs. In particular, the misfiring is recently more likely to increase due to the use of low-quality oil or the like due to the rise in oil prices. When the misfiring occurs, not only environmental pollution due to the increase in harmful emissions due to incomplete combustion, but also fatal malfunctions such as deterioration in operation performance and stoppage of operation due to damage to shafting elements may occur. Therefore, when cylinder misfiring occurs in a reciprocating internal combustion engine, which is mostly a cylinder engine, the demand for malfunction diagnosis and saving maintenance cost and time is increasing day by day.

To detect the misfiring cylinder, a method for monitoring pressure or temperature of a cylinder, a method for measuring temperature of exhaust gas, and a method for using a vibration signal or a torsional vibration signal, and the like have been used. However, these methods have limitations in general application to internal combustion engine systems due to problems such as lifetime and cost of sensors exposed to the combustion environment, and difficulty in obtaining information on which cylinder the misfiring has occurred even if the misfiring can be diagnosed, and the like. However, since automotive internal combustion engines are standardized and mass-produced, these methods are applied to the automotive internal combustion engines that can be patterned and statistically applied.

In addition, as the conventional misfiring detection method, a "method and device for detecting misfiring in an internal combustion engine" using a torsional vibration signal disclosed in the related art document is a method for determining a cylinder at a position corresponding to a peak value of a signal filtered through a band pass filter as a misfiring cylinder, which may give inaccurate results when the peak value is at a boundary of a segmentation section. In addition, in a 4-stroke engine with an angle cycle of 720°, which ends one cycle by 4 strokes of suction, compression, explosion, and exhaust, a rotational speed pulse signal installed at a top dead center position of a reference cylinder occurs twice during one cycle, so it may not be determined which of the two is at the top dead center position of the reference cylinder. As a result, there is a disadvantage in that it may not be applied to the 4-stroke engine.

DISCLOSURE

Technical Problem

The present invention is to solve the problems of the related art, and an object of the present invention is to determine whether misfiring has occurred by applying amplitude and phase characteristics of fundamental frequency components obtained by frequency analysis of a torsional vibration signal and improve malfunction diagnosis and maintenance functions of a reciprocating internal-combustion engine system by accurately detecting a position of a misfiring cylinder.

Technical Solution

In order to achieve the above object, according to the present invention, a method includes: acquiring a torsional vibration signal by using a sensor for measuring a rotational speed installed to coincide with a position of a top dead center of a reference cylinder (usually cylinder No. 1) and a sensor installed to measure a change in rotational speed by dividing an angle of one rotation into equal intervals; obtaining an amplitude and a phase of a fundamental frequency component by performing frequency analysis on the acquired torsional vibration signal; determining that a misfiring cylinder has occurred if the amplitude of the fundamental frequency component is greater than a certain level compared to a synthesized amplitude; when it is determined that the misfiring cylinder has occurred, in case of a 4-stroke engine, additionally identifying a rotational speed pulse indicating the top dead center position of the reference cylinder; obtaining a crank angle in which a vibration response of a fundamental frequency component is maximized from the position of the top dead center of the reference cylinder; calculating an explosion angle of the misfiring cylinder by using the crank angle, in which the vibration response of the fundamental frequency component is maximized and the phase of the fundamental frequency component of the excitation force; and comparing the calculated explosion angle with the explosion angle of an explosion order to specify the position of the misfiring cylinder.

Hereinafter, the present invention will be described below.

Figure 1:
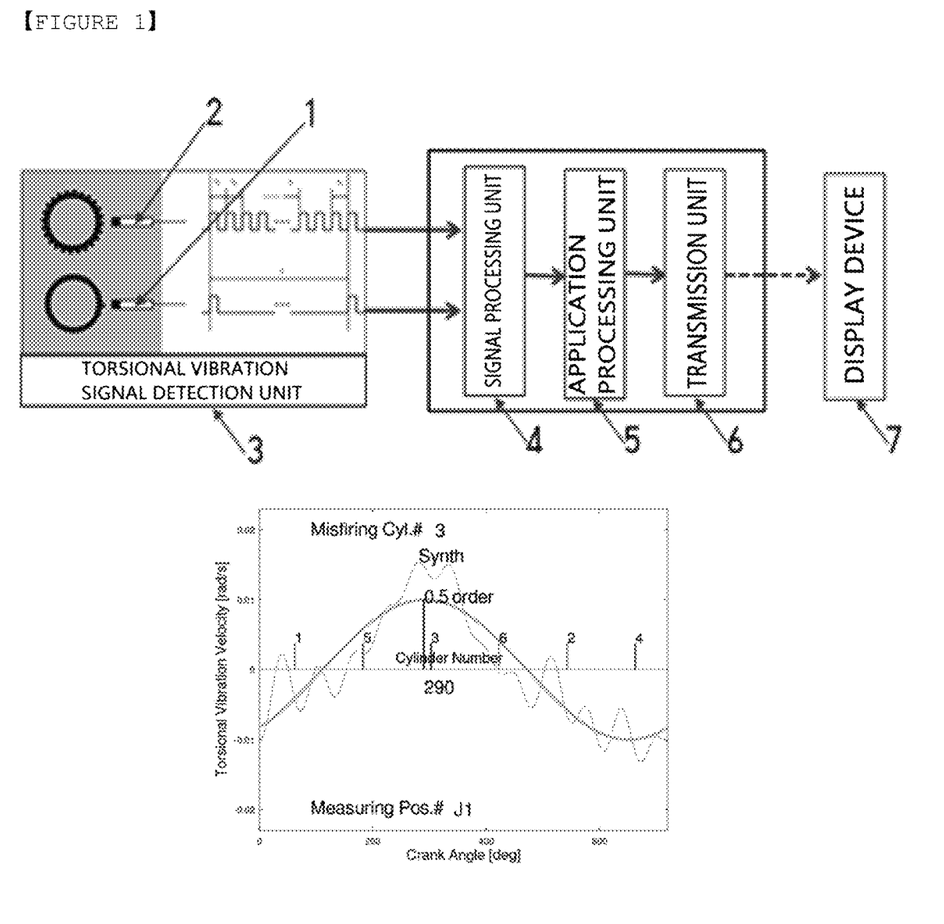
FIG. 1 is a schematic diagram illustrating method and apparatus for detecting a misfiring cylinder of an internal combustion engine according to the present invention.

FIG. 1 illustrates an example of a misfiring cylinder detected by measuring a torsional vibration signal, performing frequency analysis on the torsional vibration signal through signal processing, and then performing application processing on the torsional vibration signal.

In the present invention, as illustrated in FIG. 1, a general sensor may be used to measure the torsional vibration signal, and a sensor 1 for measuring a rotational speed at an arbitrary position where measurement is easy is installed to coincide with a position of a top dead center of a reference cylinder (usually cylinder No. 1), and a sensor 2 for measuring a change in a rotational angular velocity is installed to detect a section obtained by dividing one rotational angle of a crankshaft into equal intervals in the form of a pulse signal. The torsional vibration signal detection unit 3 acquires the torsional vibration signal using these pulse signals.

When cylinder misfiring occurs, torque due to gas explosion pressure does not act and only torque due to air cycle acts. Therefore, in the present invention, torsional vibration excitation force is first evaluated when the misfiring occurs in a reciprocating internal-combustion engine which is mostly a multi-cylinder engine.

The torsional vibration excitation force is the excitation force caused by the rotational torque acting on the crankshaft according to a series of explosion orders during one cycle. The torsional vibration excitation force F(t) of an inline and V-type reciprocating internal-combustion engine may be expressed as the sum of the fundamental frequency and harmonic components as follows:

Torsional vibration excitation force of inline reciprocating internal combustion engine:

$$F(t) = \sum_{i}^{n_{cyl}} \sum_{k}^{n} F_{0,i}(k) e^{j(\beta_i(k) - k \cdot FA_i)} \cdot e^{jk \cdot \omega t}$$

Torsional vibration excitation force of V-type reciprocating internal combustion engine:

$$F(t) = \sum_{i}^{n_{cyl}/2} \sum_{k}^{n} \left[ F_{0,iA}(k) e^{j(\beta_i(k) - k \cdot FA_{iA})} + F_{0,iB}(k) e^{j(\beta_i(k) - k \cdot FA_{iB})} \right] \cdot e^{jk \cdot \omega t}$$

wherein, $F_{0,i}(k)$, $F_{0,i}A(k)$, $F_{0,iB}(k)$: i, $i_A$, $i_B$ is amplitude of k-order component of i, $i_A$, $i_B$ cylinder excitation force, $\beta_i(k)$: i, $i_A$, $i_B$ phase of k-order component of i, $i_A$, $i_B$ cylinder excitation force, $FA_i$, $FA_{iA}$, $FA_{iB}$: i, $i_A$, $i_B$ explosion angle of i, $i_A$, $i_B$ cylinder, k: order of fundamental frequency or harmonic component, ω: rotational angular velocity, t: time, $n_{cyl}$: the number of cylinders, n: order component maximum value, and j: imaginary number.

The amplitude $F_{0,i}(k)$ and phase $\beta_i(k)$ of the torsional vibration excitation force component may be easily obtained using cylinder pressure diagrams or torque harmonic coefficients provided by engine manufacturers or classification societies for torsional vibration analysis or the like.

Since the response by the torsional vibration excitation force, which is a periodic function, is also a periodic function, the torsional vibration signal x(t) measured by the torsional vibration signal detection unit 3 may also be expressed as the sum of the fundamental frequency and harmonic components.

$$x(t) = \sum_{k}^{n} X_0(k) e^{j(k \omega t + \alpha(k))}$$

However, $X_0(k)$: amplitude of k-order component of torsional vibration signal, and $\alpha(k)$: phase of k-order component of torsional vibration signal.

When the top dead center of the reference cylinder is an origin of angle displacement, and the micro angle displacement obtained by equally dividing one rotation of the crankshaft is dx, and the position of the angle displacement in the segmentation section is $i_x$, the crank angle displacement may be represented by $\omega t = i_x dx$, so the torsional vibration signal x(t) may be represented in the form of a digitized pulse signal.

$$x(t) = \sum_{k}^{n} X_0(k) e^{j(k \cdot i_x dx + \alpha(k))}$$

The signal processing unit 4 performs frequency analysis such as Fast Fourier Transform (FFT) on the torsional vibration signal to obtain the amplitude $X_0(k)$ and phase $\alpha(k)$ of the angle displacement corresponding to the k-order difference component.

The application processing unit 5 uses the $X_0(k)$ and phase $\alpha(k)$ of the fundamental frequency component obtained from the signal processing unit 4 to perform the misfiring cylinder detection process described below.

The fundamental frequency and harmonic components of the torsional vibration signal x(t) may be expressed as the following sine function by taking an imaginary part of the above Equation.

$$x_k(t) = X_0(k) \sin(k \cdot i_x dx + \alpha(k))$$

The order component is applied to a 2-stroke engine and a 4-stroke engine as follows, considering the rotation of the crankshaft during one cycle.

k=1.0, 2.0, 3.0, . . . , n (2-stroke engine)

k=0.5, 1.0, 1.5, . . . , n (4-stroke engine)

wherein, the fundamental frequency component of the 2-stroke engine is a k=1.0-order component, and the 4-stroke engine in which two rotations of the crankshaft are one cycle is the fundamental frequency component for detecting the misfiring cylinder. The order component k shown below is called the value representing the fundamental frequency component.

Figure 2:
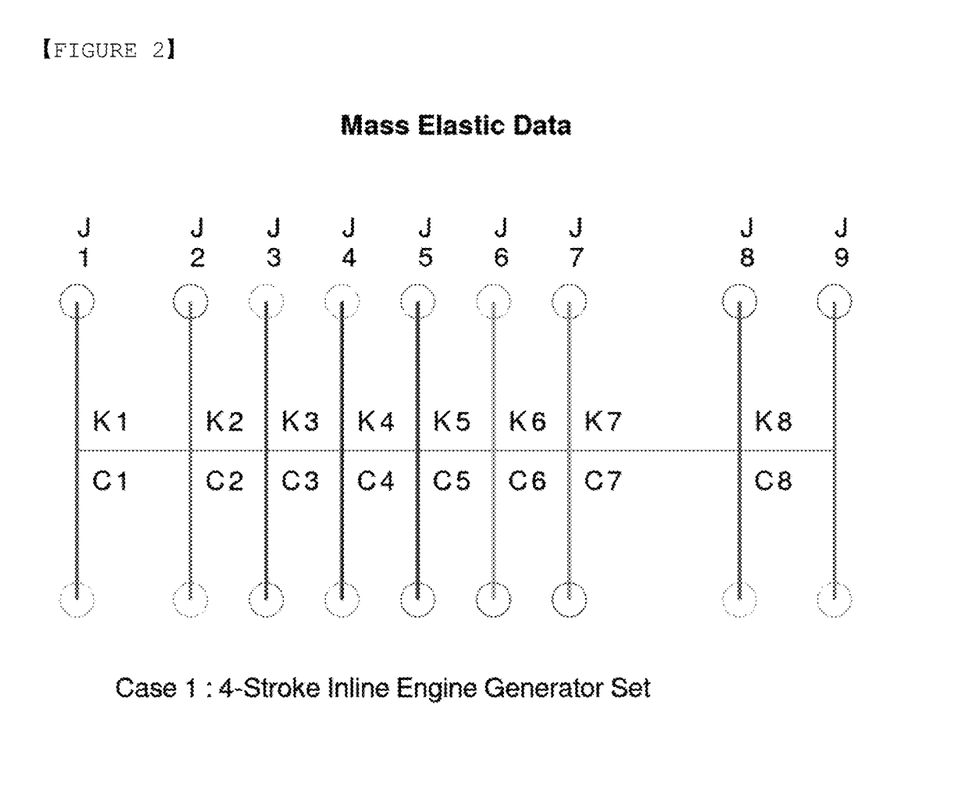
FIG. 2 is a mass-spring model of a 4-stroke inline internal combustion engine generator for numerical analysis simulation of torsional vibration.

In order to understand the torsional vibration characteristics during normal firing and misfiring, for Case 1 of a 4-stroke inline internal combustion engine system in Table 1, as illustrated in FIG. 2, the torsional vibration excitation force and the torsional vibration response angle displacement, which were modeled in a mass-damping-spring system and obtained by a general numerical analysis simulation of torsional vibration method, are shown in FIGS. 3 to 6.

Figure 3:
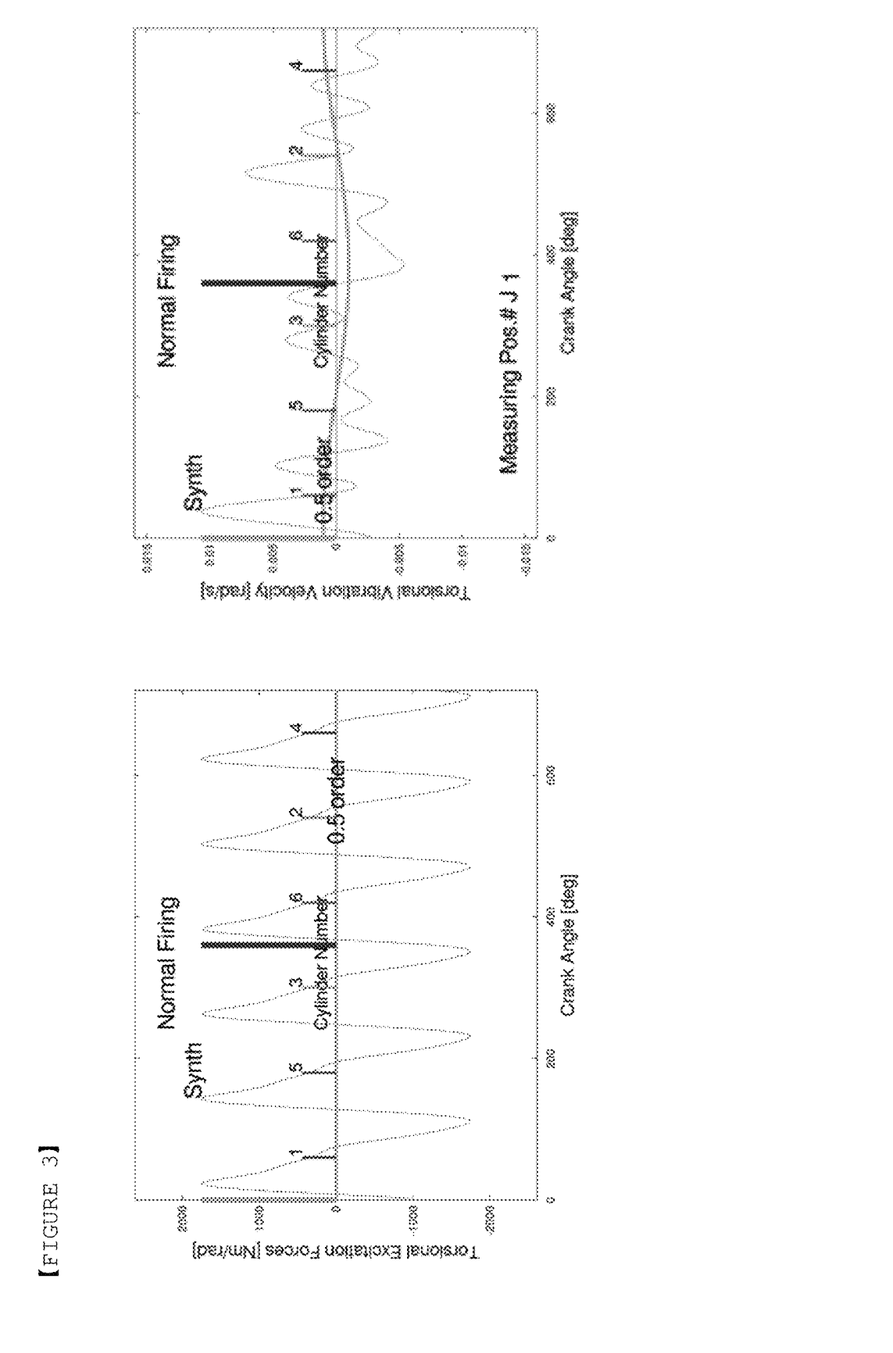
FIG. 3 is a graph of torsional vibration excitation force and vibration response of a 4-stroke inline internal combustion engine generator during normal firing.
Figure 4:
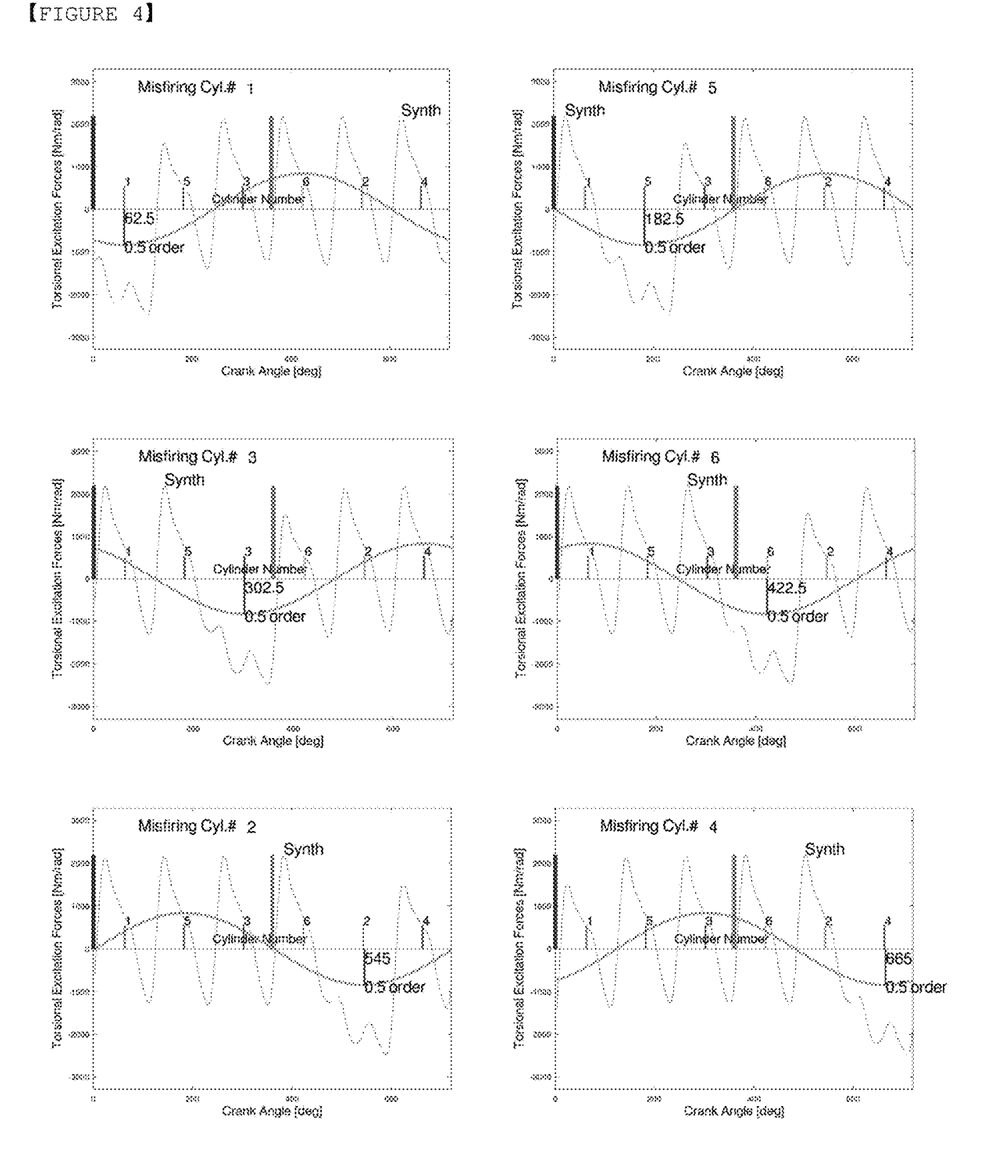
FIG. 4 is a graph of torsional vibration excitation force of the 4-stroke inline internal combustion engine generator during misfiring.
Figure 5:
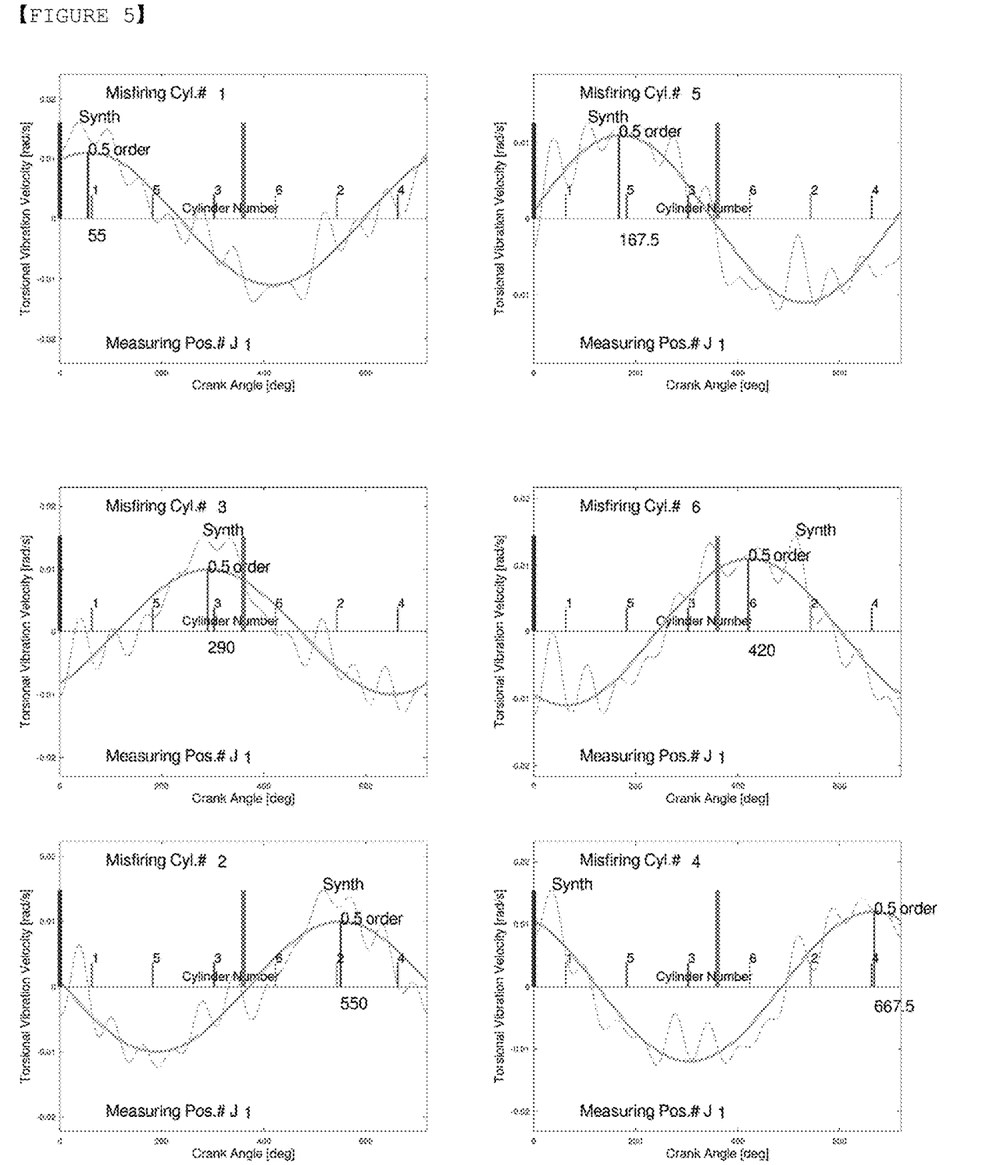
FIG. 5 is a graph of torsional vibration response of a 4-stroke inline internal combustion engine generator during misfiring.

For the torsional vibration characteristics during normal firing, as illustrated in FIG. 3, the contribution of the fundamental frequency component to both the excitation force and the torsional vibration response is very low. However, when the misfiring occurs, the excitation force of the fundamental frequency component increases as illustrated in FIG. 4, and the resulting torsional vibration response has the greatest contribution of the fundamental frequency component in the torsional vibration signal as illustrated in FIG. 5. Therefore, when the amplitude of the fundamental frequency component exceeds a certain percentage of the torsional vibration signal amplitude, it may be determined that the misfiring cylinder has occurred.

When it is determined that the misfiring has occurred, there is no problem in specifying the position of the top dead center of the reference cylinder in the 2-stroke engine since one rotation of the crankshaft is one cycle. However, in the case of the 4-stroke engine, since the detection of the rotational speed sensor of the crankshaft occurs twice in one cycle is generated twice over one cycle, and thus, it is necessary to identify which of them indicates the position of the top dead center of the reference cylinder.

In order to specify the position of the top dead center of the reference cylinder in the 4-stroke engine, the pulse signal of the rotational speed sensor that coincides with a pulse signal of a camshaft position sensor usually installed in the 4-stroke engine is identified as the pulse signal indicating the top dead center of the reference cylinder. The crank angle $i_{max}dx$ at which the fundamental frequency component of the torsional vibration signal $x_k(t)$ expressed as the sine function has the maximum value is expressed as in Equation 1, with the top dead center of the reference cylinder corresponding to the identified rotational speed pulse signal as the origin of the angle displacement.

$$i_{xmax}dx = \frac{1}{k}\left(\frac{\pi}{2} - \alpha(k)\right) \quad \text{[Equation 1]}$$

As illustrated in FIGS. 4 and 5, the misfiring cylinder is a cylinder in which an explosion stroke occurs at positions where the excitation force of the fundamental frequency component has the minimum value, and at these positions, the vibration response of the fundamental frequency component has the maximum value, so at these positions, the misfiring cylinder may be specified by obtaining the crank angle displacement.

Like the torsional vibration signal, since the torsional vibration excitation force component $F_k(t)$ of the internal combustion engine generated during misfiring of each cylinder, which is represented as illustrated in FIG. 4, may also be expressed as a sine function, $$F_k(t) = F_0(k)\sin(k \cdot i_F dx + (\beta(k) - k \cdot FA_i))$$

wherein,
$F_0(k)$: amplitude of excitation force k-order component,
$i_F dx$: crank angle displacement of excitation force,
$\beta(k)$: phase of excitation force k-order component, and
$FA_i$: explosion angle of i cylinder.

The crank angle $i_{Fmin}dx$ in which the fundamental frequency component with excitation force has the minimum value is expressed as follows.

$$i_{Fmin}dx = \frac{1}{k}\left(\frac{3\pi}{2} - \beta(k)\right) + FA_i$$

However, since the phase of the excitation force of the fundamental frequency component has a constant characteristic regardless of the position of the misfiring cylinder, when the angle displacement $i_{Fmin}dx$ with the minimum excitation force is replaced with the angle displacement $i_{xmax}dx$ with the maximum vibration response, by calculating the explosion angle of the misfiring cylinder, Equation 2 that can easily specify the position of the misfiring cylinder can be derived.

$$FA_i = i_{xmax}dx - \frac{1}{k}\cdot\left(\frac{3\pi}{2} - \beta(k)\right) \quad \text{[Equation 2]}$$

Now, by comparing the explosion angle of the misfiring cylinder calculated by Equation 2 with the explosion angle according to the explosion order in Table 2, it is possible to accurately specify the position of the misfiring cylinder.

Figure 6:
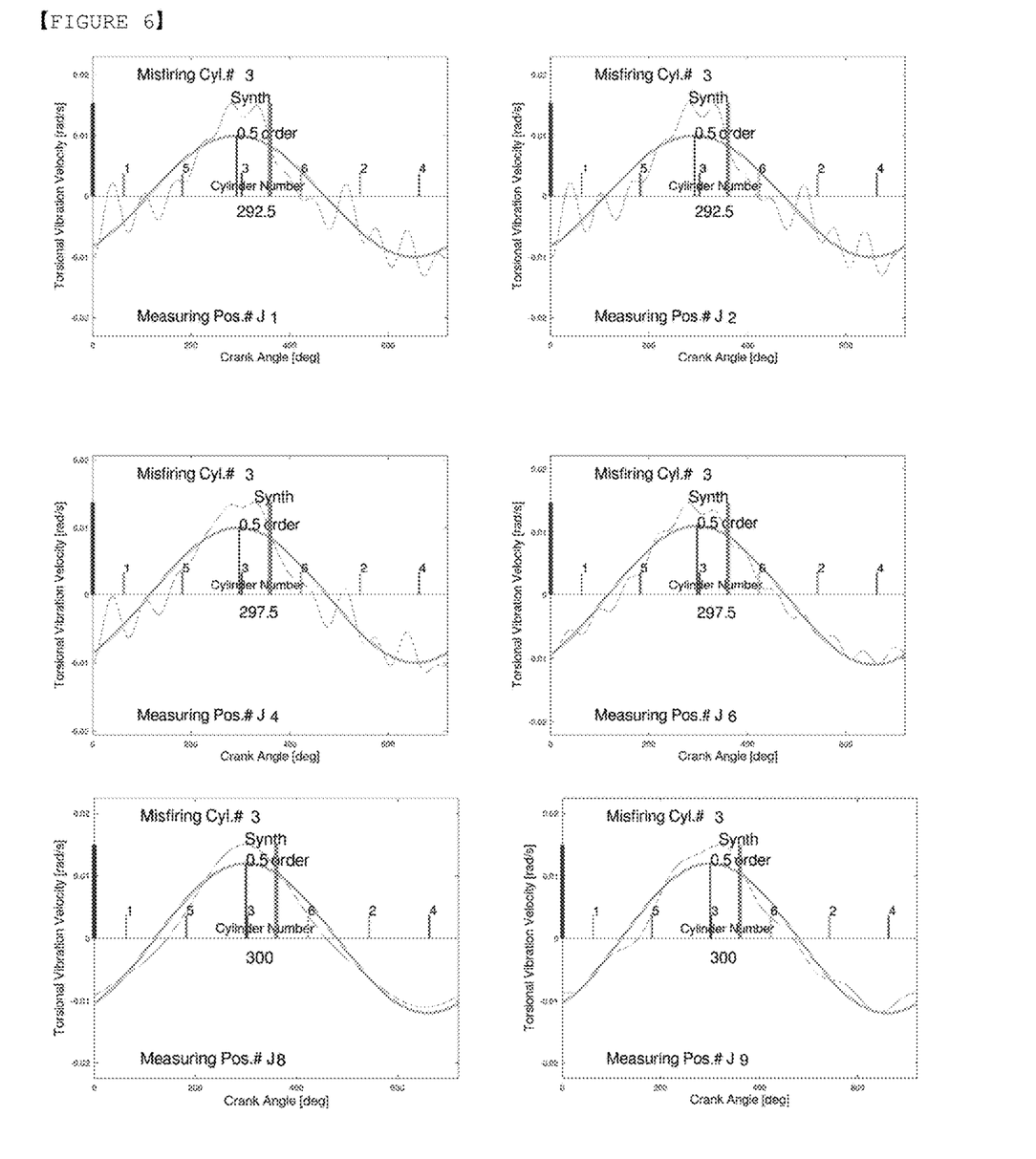
FIG. 6 is a graph of torsional vibration response according to a change in torsional vibration measurement position when misfiring of a specific cylinder (J4, Misfiring Cyl. #3) in FIG. 2 occurs.

Meanwhile, when misfiring of a specific cylinder occurs, the torsional vibration response characteristics according to the change in the torsional vibration measurement position are illustrated in FIG. 6. As illustrated in FIG. 6, when the misfiring occurs, the amplitude and phase of the torsional vibration fundamental frequency component show characteristics regardless of the measurement position, so it can be seen that the method of the present invention may be effectively used in the industrial field.

The result of the application processing unit 5 described above is displayed on the display device 7 through the transmission unit 6 or transmitted for other purposes.

Hereinafter, the present invention will be described in more detail through embodiments, but the description of these embodiments is only for illustrating the practice of the present invention, and the present invention is not limited to the description of these embodiments.

TABLE 1

| Item | Case 1 | Case 2 | Case 3 |
| --- | --- | --- | --- |
| Engine type | 4-stroke inline type | 2-stroke inline type | 4-stroke V type |
| Number of cylinders | 6 | 7 | 8 |
| Rated output | 426 kW at 1800 rpm | 4890 kW at 170 rpm | 353 kW at 1800 rpm |
| Usage | Generator | Propulsion engine for ship | Generator |
| Cylinder diameter | 130 mm | 350 mm | 128 mm |
| Stroke | 160 mm | 1400 mm | 142 mm |
| Explosion order | 1-5-3-6-2-4 | 1-7-2-5-4-3-6 | 1B-1A-3A-2B-2A-3B-4B-4A |
| Explosion angle | 0-120-240-360-480-600 | 0-51.5-104.5-153.1-208.0-255.9-310.2 | 0-90-180-270-360-450-540-640 |

Advantageous Effects

As described above, according to the present invention, it is possible to effectively detect whether a reciprocating internal-combustion engine system operated in an industrial field is misfiring and a position of a misfiring cylinder. In addition, it is possible to reduce time and costs for maintenance by preventing serious disasters such as malfunctions and shafting breakage due to misfiring in advance, thereby improving the lifetime and performance of reciprocating internal-combustion engine equipment parts such as ships, automobiles, petrochemicals, and power plants.

BEST MODE

A misfiring cylinder detection method for a reciprocating internal-combustion engine using a torsional vibration signal includes:

calculating an amplitude X0(k) and a phase α(k) of a fundamental frequency component by frequency analysis of the torsional vibration signal x(t), in detecting the misfiring cylinder using the torsional vibration signal of the reciprocating internal-combustion engine system;

comparing the amplitude $X_0(k)$ of the fundamental frequency component with the amplitude of the torsional vibration signal x(t) to determine whether the misfiring has occurred;

calculating, when the misfiring is determined to occur, a crank angle $i_{xmax}dx$ having a maximum value of the fundamental frequency component defined as in [Equation 1] below with a top dead center of a reference cylinder as an origin of crank angle displacement;

calculating an explosion angle $FA_i$ of the misfiring cylinder defined as in [Equation 2] below using the crank angle $i_{xmax}dx$ having the maximum value and an excitation force phase β(k) of the fundamental frequency component derived by the calculation of the excitation force of the internal combustion engine system; and comparing the calculated explosion angle $FA_i$ with the explosion angle of an explosion order to specify the position of the misfiring cylinder.

MODE FOR INVENTION

For a reciprocating internal-combustion engine system in Table 1, numerical analysis simulation of torsional vibration is performed, and torsional vibration excitation force and torsional vibration response are obtained. Since the torsional vibration excitation force and torsional vibration response, which are simulation results, correspond to the excitation force and response of the actual internal combustion engine system, the torsional vibration response is assumed to be the torsional vibration signal x(t) measured in the actual system, and the method of the present invention detects whether misfiring has occurred and the misfiring cylinder.

Hereinafter, a misfiring cylinder detection method and device using a torsional vibration signal according to the present invention will be described with reference to the proposed Equation and accompanying drawings.

FIGS. 4 and 5 illustrate torsional vibration excitation force and vibration response during misfiring of each cylinder in Case 1 of 4-stroke inline internal combustion engine generator in Table 1. In FIG. 5, a torsional vibration synthesis response (Synth) graph is a torsional vibration signal x(t) detected by the torsional vibration detection unit 3 in FIG. 1, and the signal processing unit 4 extracts an amplitude $X_0(k)$ and a phase α(k) of a fundamental frequency component through frequency analysis, and obtains the fundamental frequency component (0.5 order) graph in FIG. 5.

The application processing unit 5 in FIG. 1 determines that the misfiring cylinder has occurred when the amplitude $X_0(k)$ of the fundamental frequency component (0.5 order) in FIG. 5 is greater than a certain level compared to the synthesized amplitude (Synth). When it is determined that the misfiring has occurred, for the 4-stroke internal combustion engine system, as additionally illustrated in FIG. 5, when the current rotational speed pulse signal used for frequency analysis is a pulse signal that coincides with a camshaft position sensor pulse signal, a preceding pulse signal, which is the current rotational speed pulse, is identified as a pulse indicating a top dead center of a reference cylinder, otherwise a following pulse is identified as a pulse indicating the top dead center of the reference cylinder, and the top dead center of the identified reference cylinder is corrected to an origin of crank angle displacement to recalculate the phase α(k) of the fundamental frequency component (0.5 order) and a crank angle $i_{xmax}dx$ at a maximum value.

As illustrated in FIG. 5, for each cylinder misfiring, according to Equation 1, the crank angle $i_{xmax}dx$, in which the fundamental frequency component of the torsional vibration signal has the maximum value, is obtained as $i_{xmax}dx$=[55-167.5-290-420-550-667.5]. The angle displacement at which the fundamental frequency component with the excitation force is minimized when the misfiring of the reference cylinder (usually cylinder No. 1) obtained by the provided or known method occurs, is $i_{Fmin}dx$=62.5° as illustrated in FIG. 4, so a phase in an expression of a sine function of the fundamental frequency component $F_k(t)$ with excitation force is calculated as β(k)=238.75°.

Now, by substituting the phase of the fundamental frequency component with excitation force, β(k)=238.75°, the crank angle with the maximum vibration response, $i_{xmax}dx$=[55-167.5-290-420-550-667.5] into Equation 2, an explosion angle of a firing cylinder that performs an explosion stroke, $FA_i$=[−7.5, 105, 227.5, 357.5, 487.5, 605] can be found at the position where the vibration response has the maximum value. Comparing this with explosion angles [0, 120, 240, 360, 480, 600] according to the explosion order in Table 1, it can be seen that the position of the misfiring cylinder is accurately specified.

Figure 7:
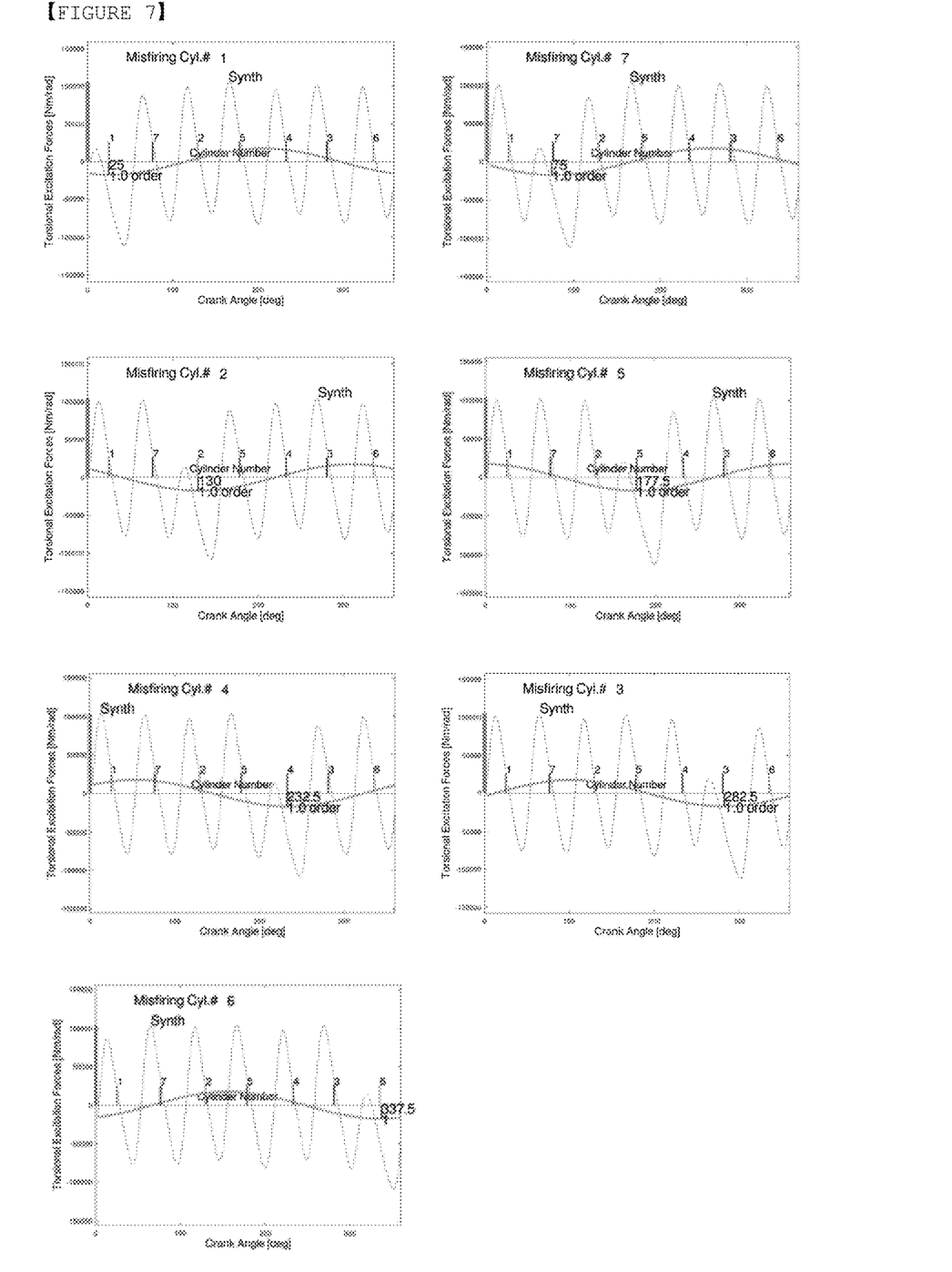
FIG. 7 is a graph of torsional vibration excitation force of a 2-stroke inline internal combustion engine propulsion shaft during misfiring.
Figure 8:
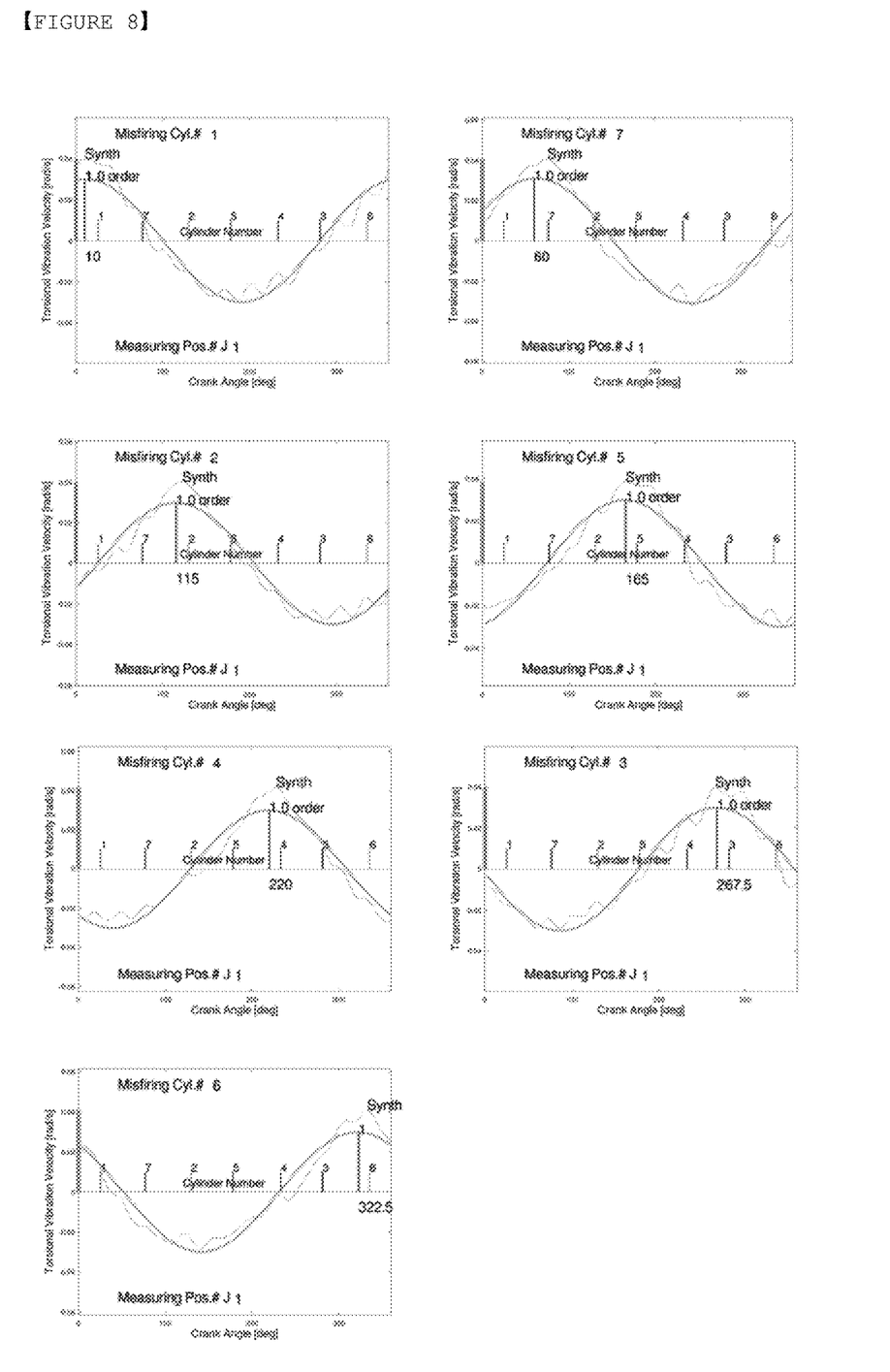
FIG. 8 is a graph of torsional vibration response of the 2-stroke inline internal combustion engine propulsion shaft during misfiring.

In the same way, in Case 2 of a 2-stroke inline propulsion shafting system in Table 1, as illustrated in FIG. 8, since the maximum value of the fundamental frequency component of the torsional vibration signal during misfiring is $i_{xmax}dx$=[10, 60, 115, 165, 220, 267.5, 322.55], in FIG. 7, the angle displacement at which the fundamental frequency component with excitation force is minimized during misfiring of reference cylinder (Cyl. #1) is $i_{Fin}dx$=25, the phase of the fundamental frequency component with excitation force is β(k)=245°, by substituting them into Equation 2, the explosion angle of the firing cylinder performing the explosion stroke at the position where the vibration response has the maximum value is calculated as $FA_i$=[−15, 35, 90, 140, 195, 242.5, 297.5]. Comparing this with the explosion angle [0, 51.5, 104.5, 153.1, 208.0, 255.8, 310.2] according to the explosion order in Table 1, it can be seen that the position of the misfiring cylinder is accurately specified.

Figure 9:
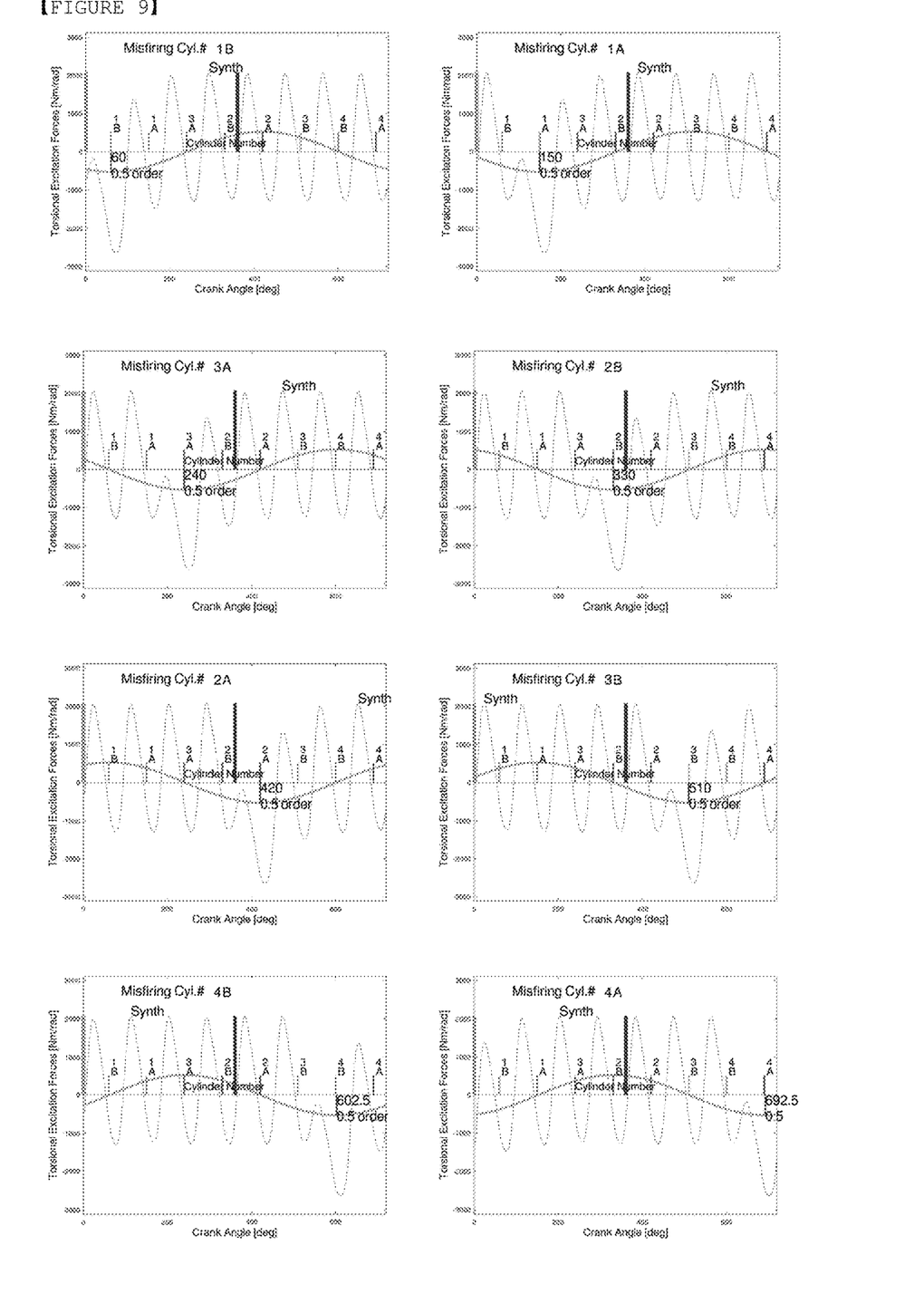
FIG. 9 is a graph of torsional vibration excitation force of a 4-stroke V-type internal combustion engine generator during misfiring.
Figure 10:
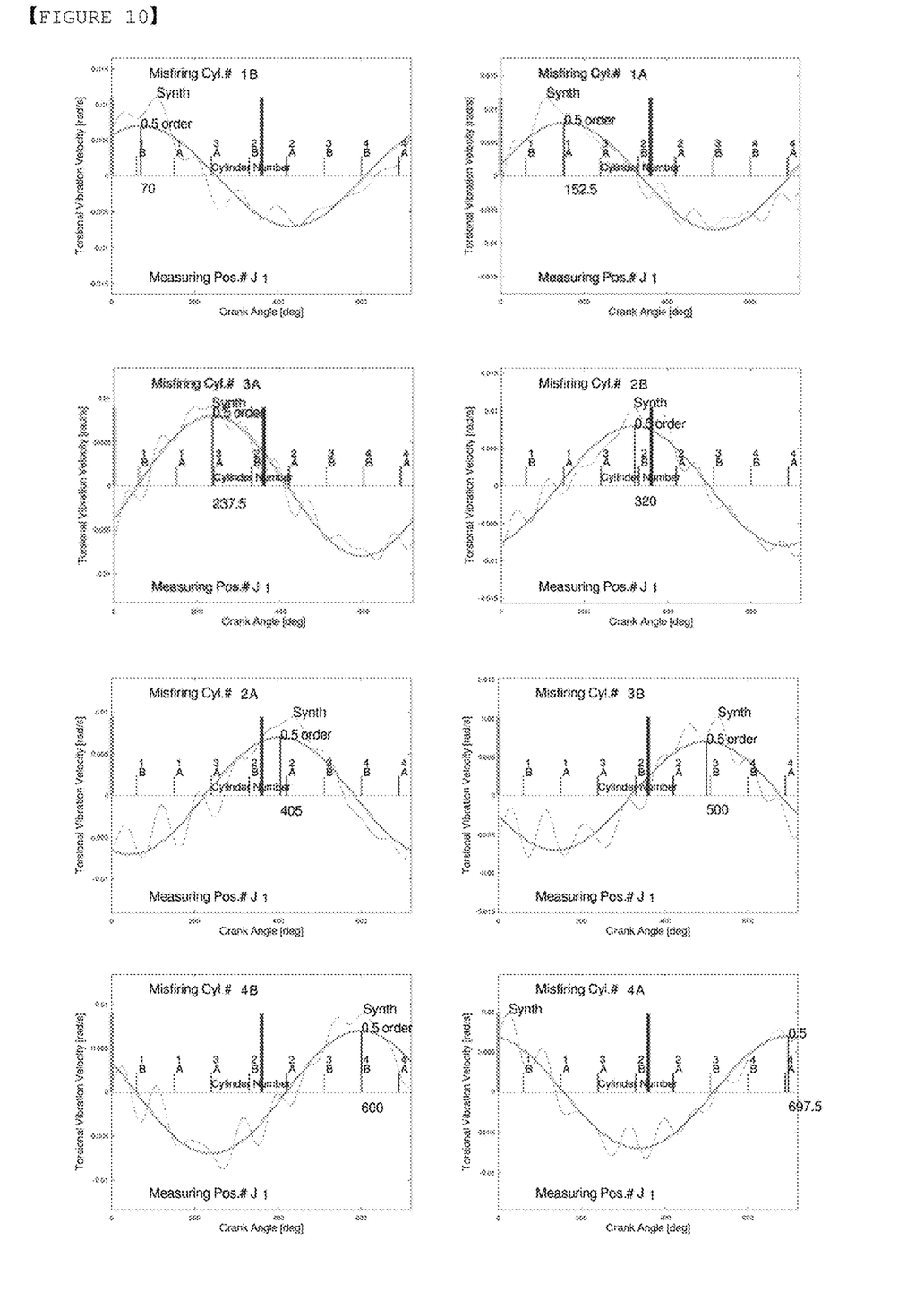
FIG. 10 is a graph of torsional vibration response of the 4-stroke V-type internal combustion engine generator during misfiring.

When the same method is applied to Case 3 of a 4-stroke V-type engine generator in Table 1, since as illustrated in FIG. 10, the crank angle in which the fundamental frequency component of the torsional vibration signal has the maximum value during misfiring is $i_{max}dx$=[70, 152.5, 237.5, 320, 405, 500, 600, 697.5], and as illustrated in FIG. 9, the angle displacement at which the fundamental frequency component with excitation force is minimized during the misfiring of the reference cylinder (Cyl. #1) is $i_{Fmin}dx=60°$ and the phase of the excitation force of the fundamental frequency component is $\beta(k)=240$, by substituting them into Equation 2, the explosion angle of the misfiring cylinder is calculated as $FA_i$=[10, 92.5, 177.5, 260, 345, 440, 540, 637.5]. By comparing this with the explosion angle [0, 90, 180, 270, 360, 450, 540, 630] in Table 1, the position of the misfiring cylinder may be specified.

INDUSTRIAL APPLICABILITY

The present invention relates to a method for detecting a misfiring cylinder, which is one of the main causes of malfunction in an internal combustion engine system such as ships, automobiles, power generation facilities, and petrochemicals, and more particularly, to a method and device for detecting whether a cylinder is misfiring and a position of a misfiring cylinder by frequency analysis of a torsional vibration signal of a reciprocating internal-combustion engine system.

According to the present invention, a misfiring cylinder detection device is configured to include a detection unit (3) for measuring a torsional vibration signal; a signal processing unit (4) for frequency analysis of the measured torsional vibration signal and extracting an amplitude and a phase of a fundamental frequency component; and an application processing unit (5) for determining whether misfiring has occurred using the extracted amplitude and phase and specifying the misfiring cylinder, thereby effectively detecting the misfiring and its position using the torsional vibration signal which is easy to measure. In this way, it is possible to prevent a disaster from being caused by the occurrence of misfiring and reduce time and cost for maintenance, thereby improving the lifetime and performance of internal-combustion engine equipment components, and thus, contribute to the development of industries using the internal combustion engine.

In addition, the present invention has industrial applicability because it has not only sufficient possibility of commercialization or business, but also realistically and clearly practicable.

The invention claimed is:

1. A misfire detection apparatus for a reciprocating internal-combustion engine, comprising:
   a torsional vibration sensor arranged at a shaft line of the engine for detecting rotational speed fluctuations, the torsional vibration sensor outputting a torsional vibration signal;
   a camshaft position sensor, optionally included for a 4-stroke engine, arranged at a camshaft of the engine for detecting a reference signal indicative of a top dead center of a reference cylinder, the camshaft positon sensor outputting a camshaft position signal;
   a signal processing unit configured to obtain amplitudes and phases of a fundamental frequency component and harmonic components by performing a Fast Fourier Transform (FFT) on the torsional vibration signal;
   an application processing unit configured to detect a misfiring event and determine a misfiring cylinder position by;
   detecting the misfiring event when the amplitude of the fundamental frequency component exceeds a preset threshold; and
   identifying the misfiring cylinder position by calculating an explosion angle ($FA_i$) of the misfiring cylinder according to the relation;

$$FA_i=ixmax \cdot dx-(1/k)(3\pi/2-\beta(k)),$$

wherein ixmax·dx is a crank-angle value obtained by multiplying ixmax, an index corresponding to a sample at which the amplitude of the fundamental frequency component of the torsional vibration signal reaches a maximum while a fundamental frequency component of the excitation force attains a minimum having a phase angle $\beta(k)$, by dx, a fixed crank-angle increment between successive torsional vibration signal samples;
   wherein $\rho(k)$ is calculated from torque harmonic coefficients and an explosion order supplied by an engine manufacturer;
   wherein, k is 1.0 for a 2-stroke engine and 0.5 for a 4-stroke engine; and
   wherein, for the 4-stroke engine, a crank-angle reference is synchronized to the top dead center of a reference cylinder using the camshaft position signal;
   a transmission unit connected the application processing unit and configured to transmit the result of the detected misfiring cylinder; and
   a display device configured to receive and display the detected misfiring cylinder.

2. A method for detecting a misfiring cylinder in a reciprocating internal combustion engine, the engine having a crankshaft and a camshaft, the method comprising:
   sensing torsional vibration of the crankshaft during engine operation using a vibration sensor and producing a torsional vibration signal reflecting instantaneous crankshaft speed fluctuations;
   receiving a camshaft position signal from a camshaft sensor, the camshaft position signal indicating a reference crank-angle position corresponding to a top dead center (TDC) of a reference cylinder in the engine cycle;
   performing a Fast Fourier Transform (FFT) on the torsional vibration signal to obtain a fundamental frequency component of the torsional vibration;
   determining a misfire when the amplitude of the fundamental frequency component exceeds a preset threshold; and
   identifying the misfiring cylinder by calculating an explosion angle ($FA_i$) of the misfiring cylinder using the fundamental frequency component of the torsional vibration signal and an excitation force function, according to the relation:

$$FA_i=ixmax \cdot dx-(1/k)(3\pi/2-\beta(k)),$$

wherein ixmax·dx is a crank-angle value obtained by multiplying ixmax, an index corresponding to a sample at which the amplitude of the fundamental frequency component of the torsional vibration signal reaches a maximum while a fundamental frequency component of the excitation force attains a minimum having a phase angle $\beta(k)$, by dx, a fixed crank-angle increment between successive torsional vibration signal samples;
   wherein $\beta(k)$ is calculated from torque harmonic coefficients and an explosion order supplied by an engine manufacturer;
   wherein k is 1.0 for a 2-stroke engine and 0.5 for a 4-stroke engine; and wherein, for the 4-stroke engine, a crank-angle reference is synchronized to the top dead center of a reference cylinder using the camshaft position signal.

\* \* \* \* \*